United States Patent
Magno et al.

(10) Patent No.: US 8,979,590 B2
(45) Date of Patent: Mar. 17, 2015

(54) CABLE GLAND FOR ELECTRICAL CABLE FITTING

(71) Applicant: Thomas & Betts International, Inc., Wilmington, DE (US)

(72) Inventors: Joey Magno, Cordova, TN (US); Rasoul Shouri, Ooltewah, TN (US); Hubert J. Morgan, II, Coldwater, MS (US)

(73) Assignee: Thomas & Betts International, LLC, Wilmington, DE (US)

( * ) Notice: Subject to any disclaimer, the term of this patent is extended or adjusted under 35 U.S.C. 154(b) by 78 days.

(21) Appl. No.: 13/826,534

(22) Filed: Mar. 14, 2013

(65) Prior Publication Data

US 2014/0030903 A1    Jan. 30, 2014

Related U.S. Application Data

(60) Provisional application No. 61/676,036, filed on Jul. 26, 2012.

(51) Int. Cl.

| | |
|---|---|
| *H01R 9/03* | (2006.01) |
| *H02G 15/013* | (2006.01) |
| *H02G 15/04* | (2006.01) |
| *H02G 15/076* | (2006.01) |

(Continued)

(52) U.S. Cl.
CPC .......... *H02G 15/013* (2013.01); *H02G 15/046* (2013.01); *H02G 15/076* (2013.01); *H02G 1/14* (2013.01); *H02G 3/0616* (2013.01); *H02G 15/007* (2013.01)
USPC .................................................. 439/607.41

(58) Field of Classification Search
CPC ..... H02G 1/14; H02G 15/013; H02G 15/046; H02G 15/076; H01R 43/00; H01R 24/38
USPC ....................................... 439/607.41–607.52
See application file for complete search history.

(56) References Cited

U.S. PATENT DOCUMENTS

| 3,538,488 A | 11/1970 | Damm et al. |
| 3,552,777 A | 1/1971 | Heinrich et al. |

(Continued)

FOREIGN PATENT DOCUMENTS

| EP | 0871254 A2 | 10/1998 |
| GB | 2265765 | 10/1993 |

OTHER PUBLICATIONS

European search report issued in corresponding EP application 13178232.8-1809, 7 pages, dated Feb. 4, 2014.

*Primary Examiner* — Khiem Nguyen
(74) *Attorney, Agent, or Firm* — Snyder, Clark, Lesch & Chung, LLP

(57) ABSTRACT

A fitting, for terminating an electrical cable having two or more conductors, a central insulation portion, and a braided outer portion, includes a substantially tubular fitting body having a central bore extending therethrough, a forward end, and a cable receiving end. A tubular sleeve is positioned within the central bore of the fitting body and configured for insertion between the center insulation portion and the braided outer portion of an installed electrical cable. A clamping ring is positioned within the central bore of the fitting body about the tubular sleeve. Upon assembly of the fitting, the clamping ring is configured to clampingly engage the central bore of the fitting body and the tubular sleeve to secure the braided outer portion of the installed electrical cable to the fitting.

24 Claims, 8 Drawing Sheets

(51) Int. Cl.
*H02G 1/14* (2006.01)
*H02G 3/06* (2006.01)
*H02G 15/007* (2006.01)

(56) References Cited

U.S. PATENT DOCUMENTS

| | | | |
|---|---|---|---|
| 3,603,912 A | 9/1971 | Kelly | |
| 4,902,244 A | 2/1990 | Endo et al. | |
| 5,336,104 A | 8/1994 | Nagamine | |
| 5,556,287 A | 9/1996 | Kuhn et al. | |
| 5,586,917 A | 12/1996 | Yagi et al. | |
| 5,588,873 A | 12/1996 | Hamai et al. | |
| 5,780,775 A | 7/1998 | Yu | |
| 5,929,383 A | 7/1999 | Marik et al. | |
| 6,504,103 B1 | 1/2003 | Meyer et al. | |
| 6,561,841 B2 | 5/2003 | Norwood et al. | |
| 6,836,402 B1 | 12/2004 | Huang | |
| 6,921,283 B2 | 7/2005 | Zahlit et al. | |
| 6,984,791 B1 | 1/2006 | Meyer et al. | |
| 7,121,903 B2 | 10/2006 | Sakaguchi et al. | |
| 7,144,279 B2 | 12/2006 | Zahnen et al. | |
| 7,182,647 B2 | 2/2007 | Muench et al. | |
| 7,497,723 B2 | 3/2009 | Brassell et al. | |
| 7,568,933 B2 | 8/2009 | Shirai et al. | |
| 7,914,326 B2 | 3/2011 | Sutter | |
| 7,976,339 B2 | 7/2011 | Buck et al. | |
| 2009/0215307 A1 | 8/2009 | Hughes | |
| 2011/0189887 A1 | 8/2011 | Borgstrom et al. | |

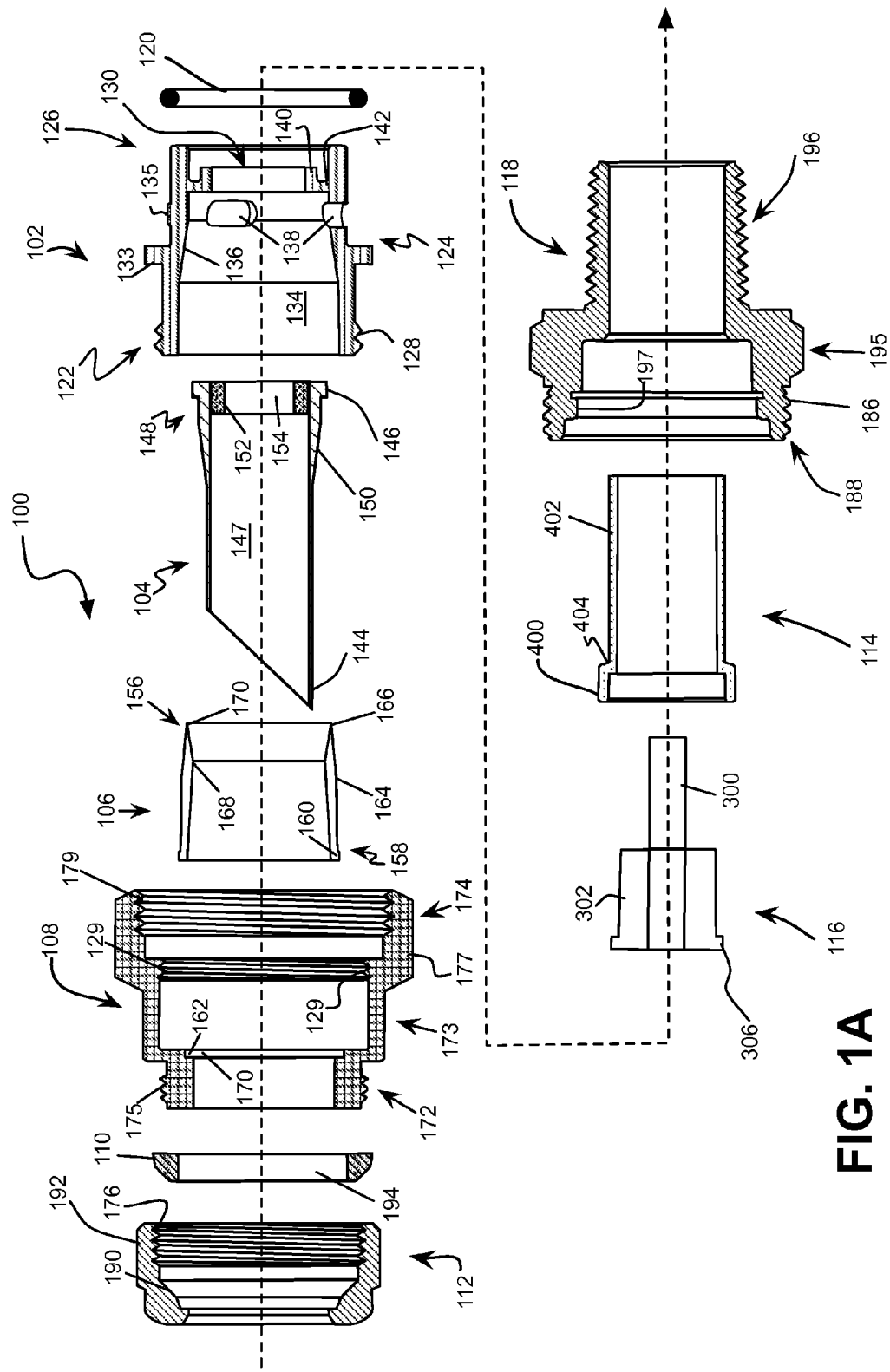

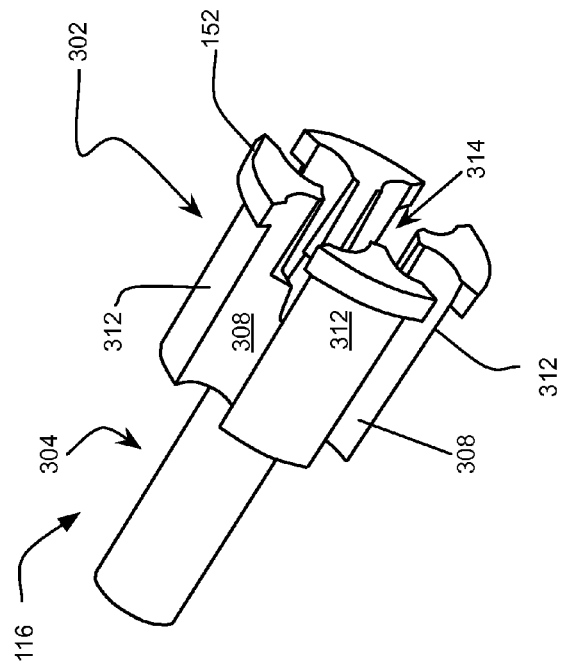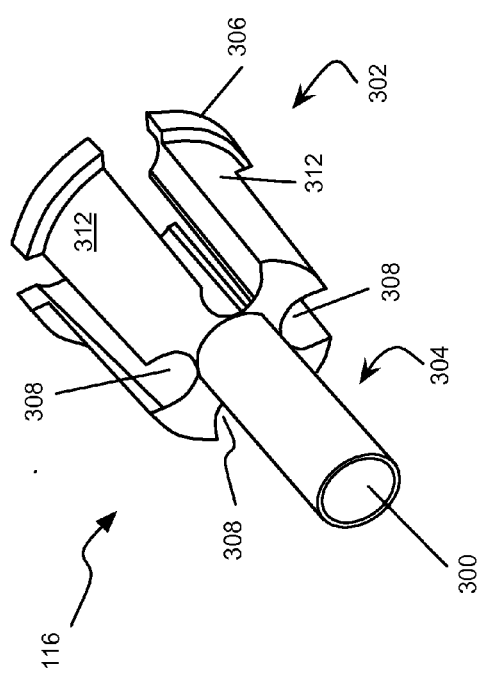

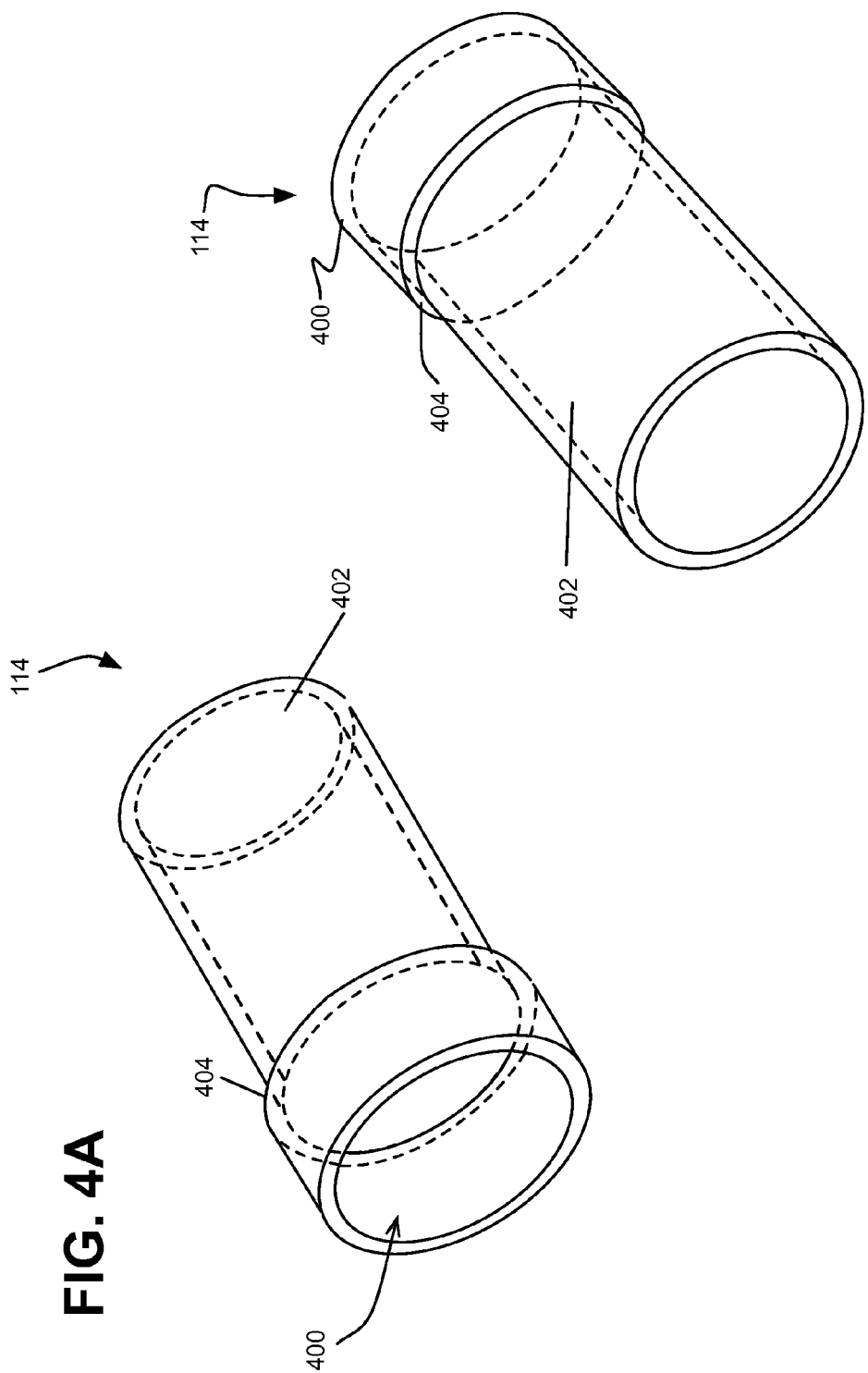

CABLE GLAND FOR ELECTRICAL CABLE FITTING

CROSS-REFERENCE TO RELATED APPLICATION

This application claims priority under 35 U.S.C. §119, based on U.S. Provisional Patent Application No. 61/676,036 filed Jul. 26, 2012, the disclosure of which is hereby incorporated by reference herein.

BACKGROUND OF THE INVENTION

Connectors and fittings have long been used to terminate and connect cables or conduits that carry electrical power or communication signals. Electrical cables are supplied in various configurations often based upon a particular use or the location in which the cables are to be used. One type of electrical cable includes an outer insulating jacket overlaying a metallic or conductive braiding. The braiding overlays an inner insulator, which itself maintains a number of insulated conductors extending therethrough. Connectors used to terminate these types of cables are typically configured to seal the cable to the connector during assembly of the fitting onto a prepared cable end.

BRIEF DESCRIPTION OF THE DRAWINGS

FIG. 1A is an exploded, schematic, cross-sectional view of an exemplary embodiment of an electrical cable fitting consistent with implementations described herein;

FIGS. 3A and 3B are rear and front isometric views, respectively, of an exemplary sealing cartridge of FIG. 1A; and FIGS. 4A and 4B are rear and front isometric views, respectively, of an exemplary sealing sleeve of FIG. 1A.

DETAILED DESCRIPTION OF THE PREFERRED EMBODIMENTS

The following detailed description refers to the accompanying drawings. The same reference numbers in different drawings may identify the same or similar elements.

One or more embodiments disclosed herein relate to improved electrical cable fittings for terminating insulated electrical cables. More specifically, the described electrical cable fittings may include a main nut, a fitting body, and a hub nut each having a central bore therein. To secure an installed electrical cable within the fitting, an angled tubular sleeve is inserted within the body and a resilient, tubular clamping ring is inserted within the main nut. The clamping ring is provided within a tapered or angled configuration designed to engage or interact with an inner surface of the fitting body during assembly of the fitting.

During assembly, the angled sleeve is inserted between the braiding and the inner insulator on the prepared cable end until the braiding abuts an end of the sleeve. The main nut is then threaded onto the body, causing the clamping ring to be received within the fitting body and further causing the clamping ring to engage the braiding thereby clamping the cable within the fitting between the clamping ring and the conical sleeve.

In one embodiment, a portion of the fitting body may be provided with one or more slots or apertures therein. The slots may allow visual inspection of the clamped engagement of the clamping ring, the cable braiding, and the angled sleeve, following assembly of the main nut to the fitting body, but prior to assembly of the hub nut to the main nut.

Figure 1B:
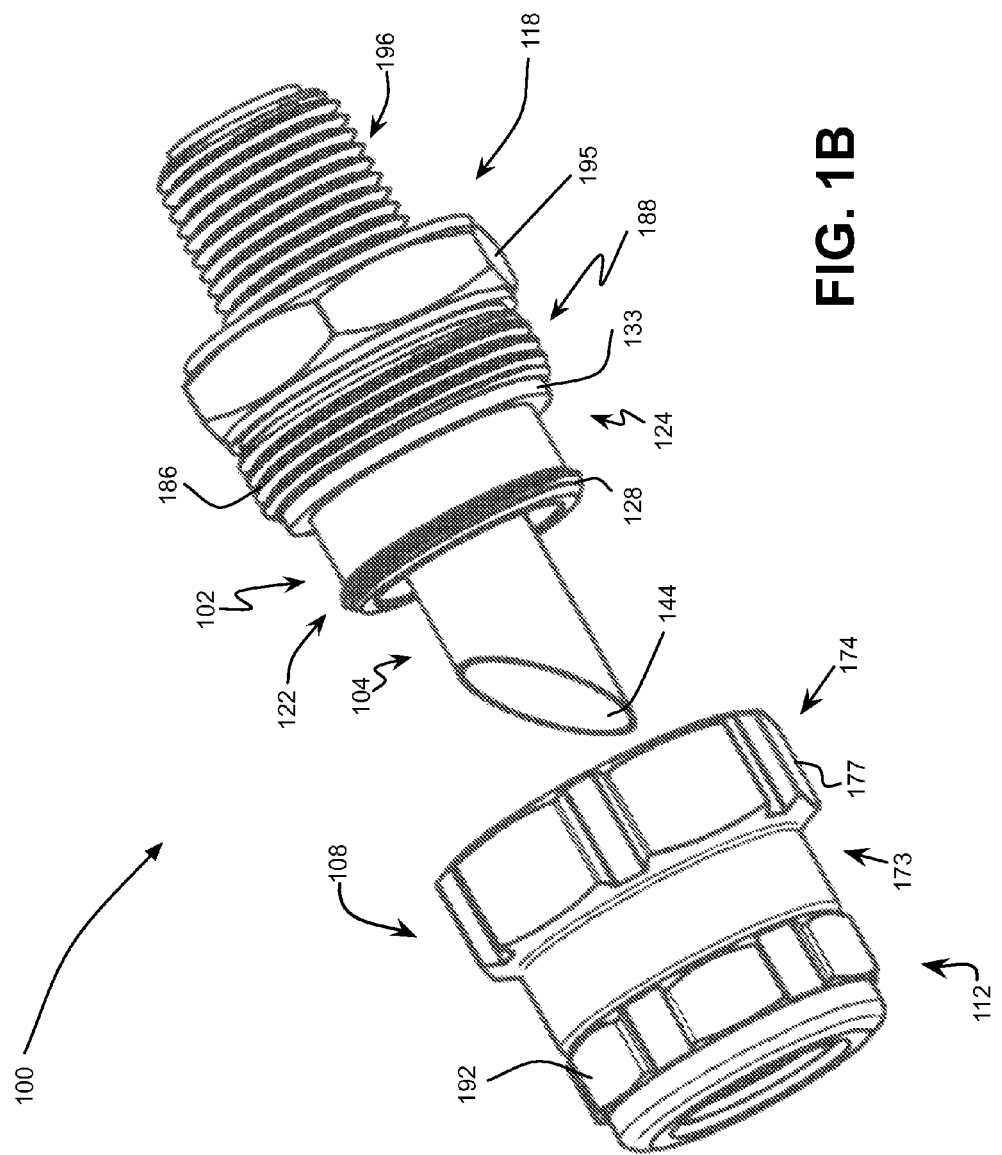
FIG. 1B is an isometric, schematic view of the electrical cable fitting of FIG. 1A in a partially assembled configuration.
Figure 1C:
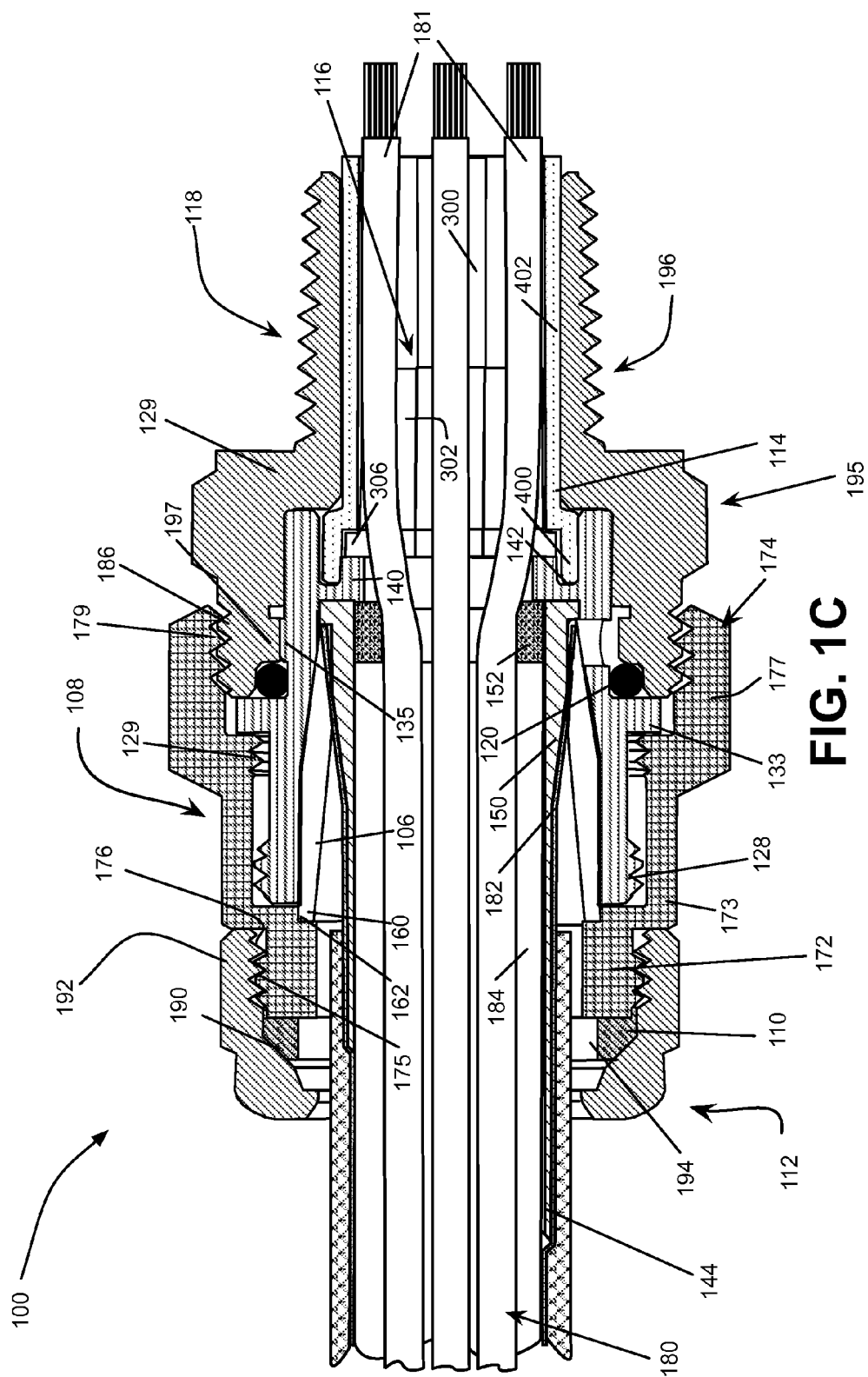
FIG. 1C is a cross-sectional view of the electrical fitting of FIG. 1A in a fully assembled configuration.
Figure 1D:
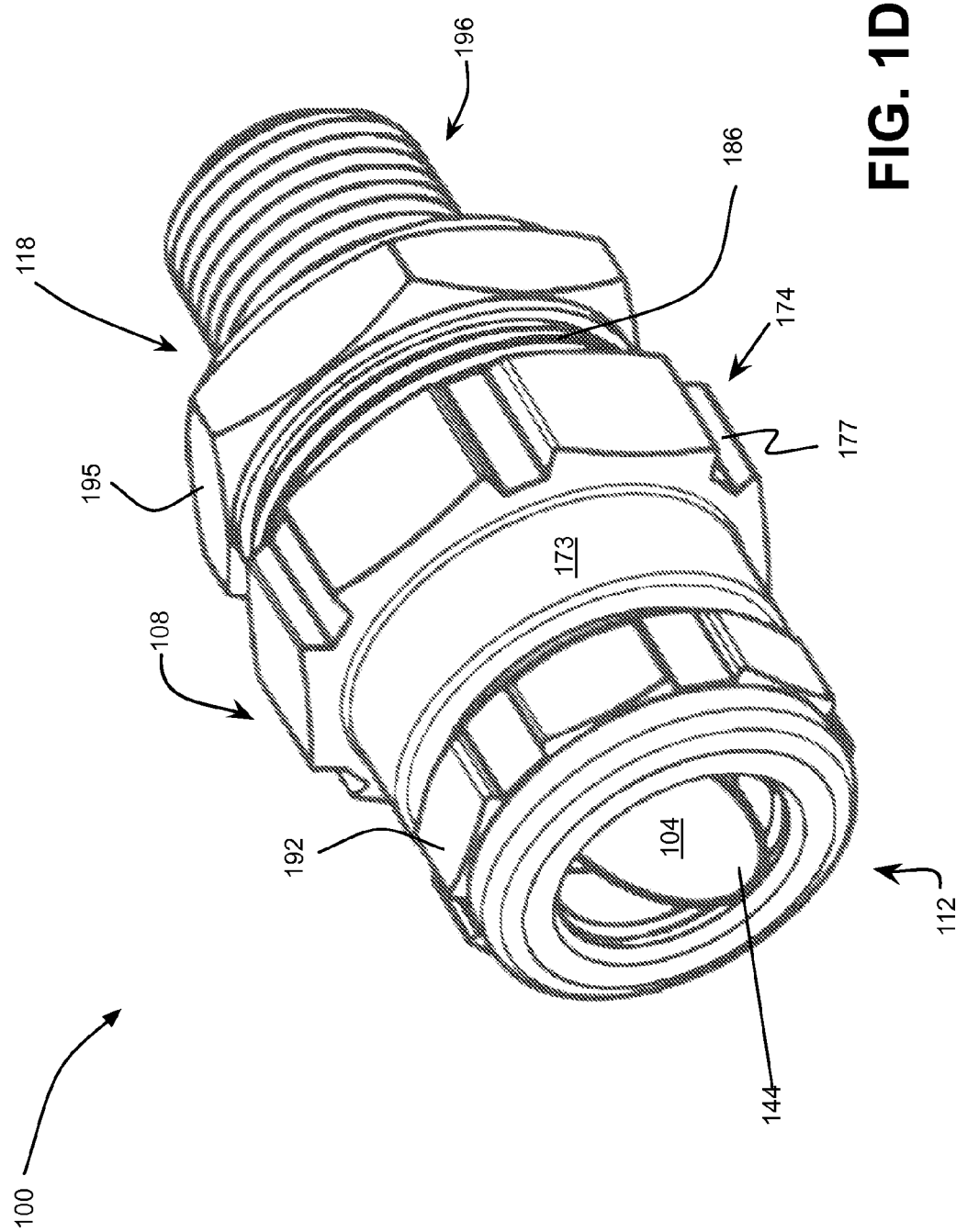
FIG. 1D is an isometric, schematic view of the electrical cable fitting of FIG. 1A in a fully assembled configuration.

FIG. 1A is an exploded cross-sectional view of an exemplary embodiment of an electrical cable fitting 100 consistent with implementations described herein. FIG. 1B is an isometric view of cable fitting 100 in a partially assembled configuration. FIG. 1C is a cross-sectional view of fitting 100 in an assembled configuration. FIG. 1D is an isometric view of cable fitting 100 in an assembled configuration. As illustrated in FIGS. 1A-1D, fitting 100 may include a fitting body 102, a tubular sleeve 104, a clamping ring 106, a main nut 108, a compression bushing 110, a gland nut 112, a sealing sleeve 114, a sealing cartridge 116, a hub nut 118, and an O-ring 120. In the following description, the relative terms "rearward" and "forward" are used to designate various portions or components of fitting 100 in reference to a direction of insertion of an electrical cable therein. It should be understood that these terms are descriptive only and that in some implementations, the terms may be reversed, such as in reference to a removal of the electrical cable from fitting 100.

As shown in FIG. 1A, fitting body 102 includes an elongated hollow generally tubular member having an enlarged cable receiving end 122, an intermediate portion 124, and a smaller conductor egressing end 126 opposing cable receiving end 122. Cable receiving end 122 may include external threads 128 formed thereon for engaging internal threads 129 in main nut 108 in the manner described below. Conductor egressing end 126 includes a sleeve receiving portion 130 configured to engage a rearward end 400 of sealing sleeve 114 during assembly of fitting 100. Intermediate portion 124 includes an external annular flange 133 and annular rib 135. As described below, flange 133 may engage a portion of main nut 108 and act as a positive stop during assembly of fitting 100. Further, as shown in FIG. 1B, flange 133 and rib 135 may together engage O-ring 120 to seal fitting 100 from outside environmental moisture.

Fitting body 102 includes an internal central bore 134 extending along a central longitudinal axis (depicted as a dashed line in FIG. 1A) between cable receiving end 122 and conductor egressing end 126 for receiving tubular sleeve 104 and clamping ring 106 therein. In one embodiment, central bore 134 may include an angled annular portion 136 proximate to intermediate portion 124 for engaging clamping ring 106 during assembly of fitting 100.

Figure 2B:
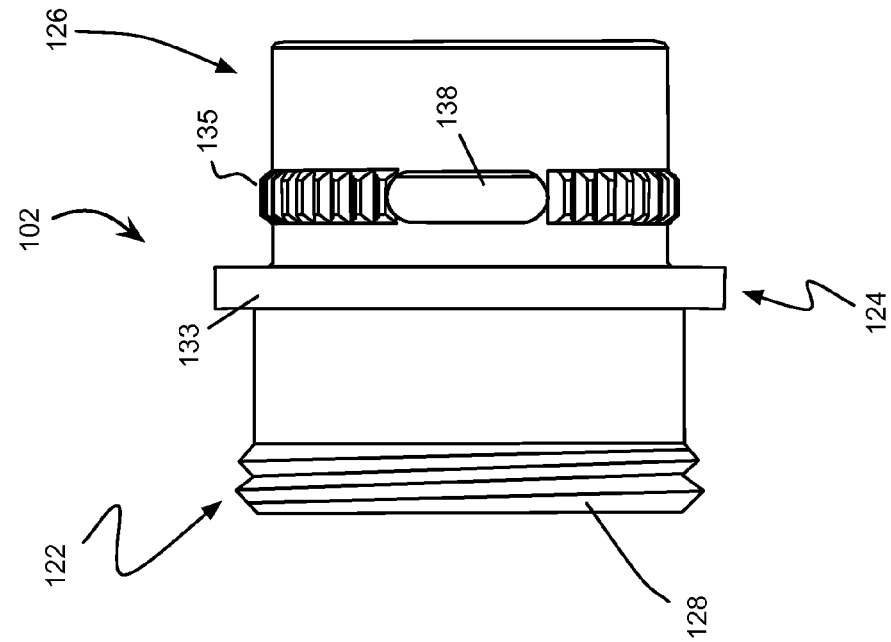
FIGS. 2A-2C are schematic, cross-sectional, side, and isometric views, respectively, of an exemplary fitting body of FIG. 1A.
Figure 2A:
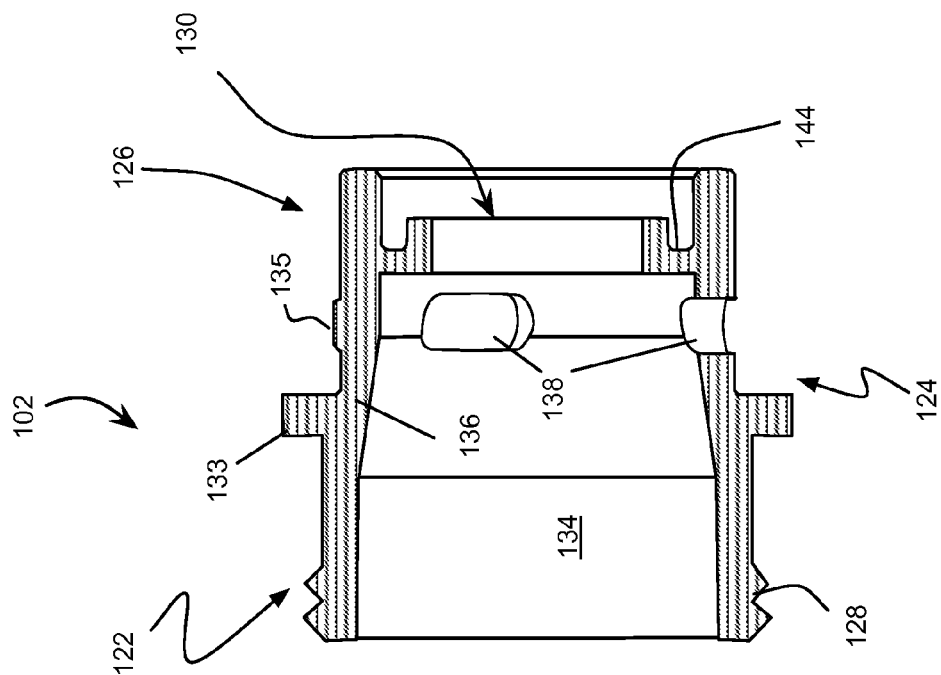
Figure 2C:
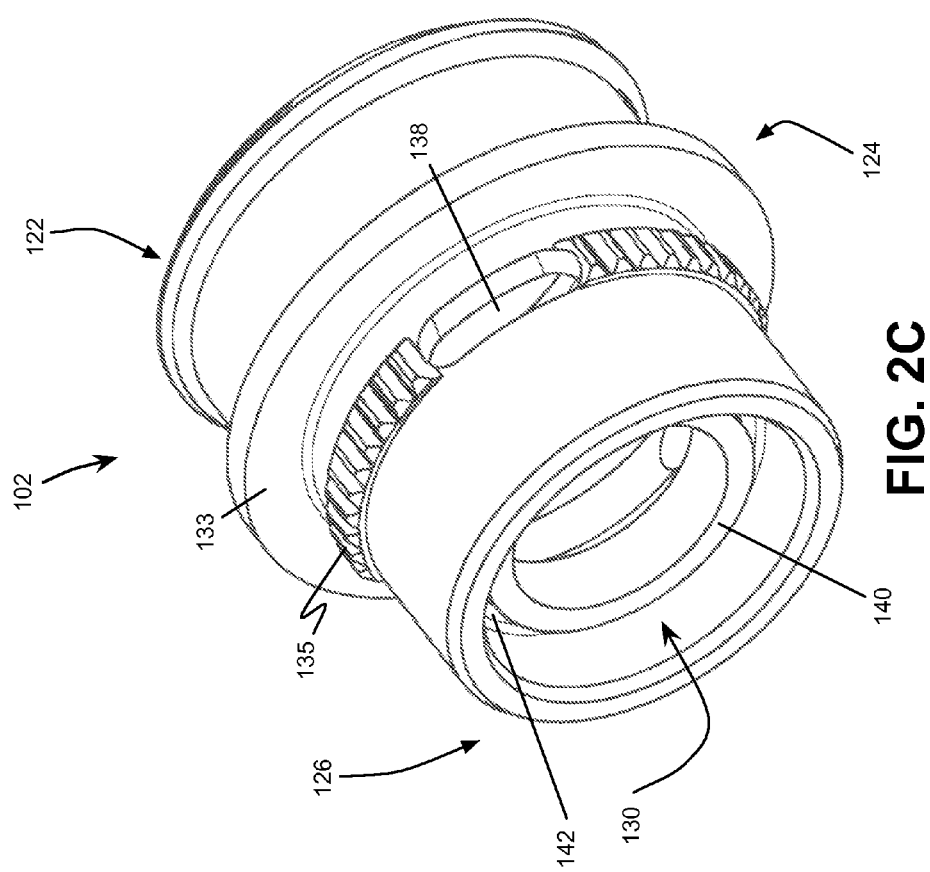

FIGS. 2A-2C depict cross-sectional, side, and isometric views, respectively, of an exemplary fitting body 102. As shown, fitting body 102 may include one or more apertures 138 therein (two of which are shown in FIG. 1A) for enabling visual confirmation of cable clamping within central bore 134. Apertures 138 may be spaced apart in a radial configuration to enable visible access to central bore 134 from any of a number of positions about fitting 100, upon insertion of an electrical cable 180 (FIG. 1C) into fitting body 102, but prior to insertion of fitting body 102 into hub nut 118.

As shown in FIG. 2B, in one exemplary implementation, apertures 138 may be positioned in line with rib 135. That is, portions of annular rib 135 may be removed to form apertures 138. Any suitable numbers of apertures 138, e.g., three or four apertures 138, may be formed to facilitate efficient visual access to bore 134, e.g., in a full 360° within fitting body 102. In this manner, following insertion of electrical cable 180 within fitting body 102, an examination of a clamping relationship of clamping ring 106 and tubular sleeve 104 may be made via apertures 138. In some implementations, as shown in FIGS. 2B and 2C, annular rib 135 may include a grooved or keyed configuration to mate with a correspondingly grooved portion of hub nut 118 during assembly of fitting 100.

As shown in FIG. 1A, sleeve receiving portion 130 of fitting body 102 includes an internal tubular portion 140 projecting radially inwardly from central bore 134 and having an inside diameter smaller than the inside diameter of the remainder of fitting body 102. A rearward end of internal tubular portion 140 is configured to receive/engage a forward end of tubular sleeve 104 during assembly of fitting 100, as described below.

As shown in FIG. 1A, the forward end of internal tubular portion 140 includes an annular groove 142 formed therein for receiving rearward end 400 of sealing sleeve 114, as described below. In addition, the forward end of tubular portion 140 may have an internal diameter sized to receive exposed conductors 181 of electrical cable 180 (FIG. 1C) and may have a diameter that is smaller than the outside diameter of a rearward portion of sealing cartridge 116, thus effectively retaining sealing cartridge 116 within sealing sleeve 114 upon assembly (or partial assembly) of fitting 100.

Tubular sleeve 104 includes a generally cylindrical configuration having rearward cable receiving end 144, and a forward cable egressing end 146 and a central bore 147 formed therethrough. As shown, in one exemplary implementation, cable receiving end 144 includes an angled or beveled configuration. For example, cable receiving end 144 may include an angle of approximately 30-60° relative to the axial direction of fitting 100. As depicted in FIG. 1C, the angled nature of cable receiving end 144 may enable tubular sleeve 104 to become efficiently interposed between conductive braiding 182 and center insulation 184 of electrical cable 180 during assembly of fitting 100. That is, the pointed end of cable receiving end 144 may be efficiently driven between braiding 182 and insulation 184 of cable 180, with center insulation 184 (and conductors 181 embedded therein) passing into central bore 147 and braiding 182 passing over the outer surface of tubular sleeve 104.

Forward cable egressing end 146 includes a flanged base 148 having an outside diameter approximately similar to the inside diameter of intermediate portion 124 of fitting body 102. As described briefly above, during assembly, flanged base 148 of tubular sleeve 104 is configured to seat onto the rearward end of internal tubular portion 140 and frictionally engage the internal tubular surface of intermediate portion 124 to retain tubular sleeve 104 within fitting body 102 prior to and during assembly.

As shown in FIG. 1A, forward cable egressing end 146 further includes a conical outer surface 150 configured to engage clamping ring 106 during final assembly of fitting 100. More particularly, a rearwardmost portion of cable egressing end 146 may have an outside diameter smaller than a forwardmost portion of cable egressing end 146, thereby providing the conical configuration.

As shown in FIGS. 1C and 1D, in one exemplary embodiment, a total length of tubular sleeve 104 may be provided such that the pointed end of cable receiving end 144 of tubular sleeve 104 projects from main nut 108 and gland nut 112 upon final assembly of fitting 100. In one implementation, the length of tubular sleeve 104 may be sufficient to cause the point of cable receiving end 144 to project from main nut 108 when fitting 100 is in an intermediate assembled configuration, in which threads 128 in fitting body 102 are threaded with threads 129 in main nut 108. In this manner, electrical cable 180 may be easily inserted into fitting 100, by placing the exposed pointed end of tubular sleeve 104 between the braiding 182 and the insulation 184 of cable 180 and pushing cable 180 forwardly into fitting 100.

In one implementation, central bore 147 in cable egressing end 146 may include an sealing barrier 152 formed therein. As shown in FIG. 1A, integrated sealing barrier 152 may be provided within bore 147 of tubular sleeve 104 and may include a tubular bore 154 formed therein for resiliently receiving a portion of an electrical cable inserted therethrough (see, e.g., conductors 181 of cable 180 in FIG. 1C). In some implementations, sealing barrier 152 may be formed of a resilient material, such as latex, rubber, etc. As described below, during assembly of fitting 100, sealing barrier 152 may engage inserted electrical cable 180 and prevent the injected or distributed sealing compound from flowing into tubular sleeve 104 rearward of barrier 152. In some embodiments, sealing barrier 152 may be formed or positioned within tubular sleeve 104 prior to assembly of fitting 100, e.g., during the manufacture of tubular sleeve 104.

Clamping ring 106 includes a forward end 156 and a rearward end 158 and is configured to engage angled portion 136 of fitting body 102 and outer surface 150 of tubular sleeve 104 during assembly of fitting 100 to clampingly engage braiding 182 of cable 180 therebetween. As shown in FIG. 1A, clamping ring 106 includes a generally cylindrical configuration formed of a resilient material, such as a plastic, a polymer, or a rubber. In one embodiment, rearward end 158 of clamping ring 106 includes a outer flange 160 for engaging a corresponding notch 162 in an inner surface of main nut 108 (described below). In some embodiments, an outside diameter of flange 160 may be slightly larger than an inside diameter of notch 162 in main nut 108, thereby enabling clamping ring 106 to be press-fit into notch 162 prior to final assembly of fitting 100.

As shown in FIG. 1A, the outside surface of clamping ring 106 may include a tapered or angled configuration, in which an intermediate outside portion 164 includes an outside diameter larger than a forward outside portion 166. The inside surface of clamping ring 106 may include an opposing tapered configuration, in which an intermediate inside portion 168 includes an inside diameter that is smaller than an inside diameter of the forward inside portion 170.

In the manner described below, upon threading main nut 108 onto fitting body 102, forward end 156 of resilient clamping ring 106 may be deflected inwardly by angled portion 136 in central bore 134 of fitting body 102 as well as outer surface 150 of tubular sleeve 104. As shown in FIG. 1B, this configuration functions to clamp or secure braiding 182 of electrical cable 180 between clamping ring 106 and tubular sleeve 104. In some implementations, depending on the resiliency of a material used, clamping ring 106 may include one or more slots, slits, or holes for enabling clamping ring 106 to deflect or deform inwardly upon bias against angled portion 136 of fitting body 102. For example, a number of axial slots may be formed in forward end 156 of clamping ring 106.

Returning to FIG. 1A, main nut 108 may include an elongate hollow generally tubular member having a rearward cable receiving end 172, an intermediate portion 173, and a forward end 174. As shown, rearward cable receiving end 172, intermediate portion 173, and forward end 174 may be formed in a substantially annularly notched configuration, such that rearward cable receiving end 172 has smaller inside and outside diameters than intermediate portion 173, and intermediate portion 173 has smaller inside and outside diameters than forward end 174. For example, an inside diameter of rearward cable receiving end 172 may be sized to accommodate electrical cable 180 inserted therethrough. An inside diameter of intermediate portion 173 may be sized to accommodate cable receiving end 122 of fitting body 102, as shown in FIG. 1B. A shoulder 170 may be formed at an internal transition between rearward cable receiving end 172 and intermediate portion 173. As described briefly above, and as shown in FIG. 1B, shoulder 170 may include notch 162 for receiving and engaging flange 160 in clamping ring 106 rearward end 158.

In one embodiment, rearward cable receiving end 172 of main nut 108 may include external threads 175 formed thereon for engaging internal threads 176 in gland nut 112. Additionally, an axial length of intermediate portion 173 may provide an area for marking certifications and branding. A forward portion of intermediate portion 173 may be provided with internal threads 129 for engaging external threads 128 in fitting body 102 during an intermediate assembly of fitting 100. For example, when fitting 100 is assembled such that threads 128 engage threads 129, clamping ring 106 may be in an uncompressed state or relaxed state, thereby allowing braiding 182 of electrical cable 180 to be slid or pushed over tubular sleeve 104, as described above, and yet maintain fitting body 102 in a retained relationship with respect to main nut 108.

Forward end 174 of main nut 108 may include a tool engaging outer surface 177. For example, outer surface 177 may include a hexagonal configuration on at least a portion thereof for engaging a torque applying tool, such as a wrench. In other implementations, other engagement surfaces may be used, such as knurling, notching, etc. As shown in FIG. 1A, forward end 174 of main nut 108 may include internal threads 179 for engaging external threads 186 provided on a rearward end 188 of hub nut 118, during final assembly of fitting 100, as described below.

As shown in FIGS. 1A and 1B, gland nut 112 may include a substantially tubular configuration having an forwardly angled inner surface 190 for engaging compression bushing 110 and urging it toward rearward end 172 of main nut 108 upon tightening of gland nut 112 relative to main nut 108, e.g., via an outer tool engaging surface 192 on gland nut 112. As described briefly above, internal threads 176 are provided in gland nut 112 for engaging external threads 175 in main nut 108 to secure compression bushing 110 within fitting 100.

In one implementation, compression bushing 110 may include a substantially frustoconically-shaped elastomeric material having a bore 194 therethrough. The frustoconical shape may be configured to engage angled surface 190 in gland nut 112. Upon compression between gland nut 112 and main nut 108, an internal diameter of bore 194 may shrink. Thus, when cable 180 has been received within gland nut 112, bushing 110, and main nut 108, compression of bushing 110 may seal and secure cable 180 within fitting 100. By virtue of its elastomeric material, bushing 110 may adapt to retain cables having a variety of sizes.

Sealing cartridge 116 may have a generally tubular configuration to be received within sealing sleeve 114, as described below. FIGS. 3A and 3B are front and rear isometric views, respectively, of an exemplary sealing cartridge 116. Sealing cartridge 116 may include a central bore 300 formed therethrough, a conductor separating portion 302, and a sealant administration portion 304. Conductor separating portion 302 may include an annular shoulder 306 and a number of radially spaced conductor maintaining notches or slots 308 formed axially in a periphery of conductor separating portion 302.

In one implementation, annular shoulder 306 is formed at a rearward end of cartridge 116 and may be configured to engage a corresponding shoulder portion 404 in sealing sleeve 114, during insertion of sealing cartridge 116 into sealing sleeve 114. As shown in FIGS. 3A and 3B, in one embodiment, each of slots 308 may having a generally cylindrical configuration, although other non-cylindrical shapes or cross-sections may also be used. Additionally, conductor separating portion 302 may include a number of rearwardly projecting portions 312 corresponding to the number of slots 308. Rearwardly projecting portions 312 may be configured to extend slots 308 beyond an internal length of central bore 300 in cartridge 116, such that a sealant receiving chamber 314 is formed between rearwardly projecting portions 312. Upon assembly, sealant receiving chamber 314 is positioned between electrical cable conductors 181 (three of which are shown in FIG. 1C) received within slots 308. As described below, sealant receiving chamber 314 allows for efficient distribution of sealing compound around and between conductors 181 during assembly of fitting 100.

Formed in a forward end of cartridge 116, sealant administration portion 304 may form a tube for administering a sealing compound (also referred to as a sealant) to sealant receiving chamber 314 via central bore 300. In some embodiments, as shown in FIG. 3A, an outside diameter of sealant administration portion 304 may be sized so as to align with a radially inward portion of slots 308, thereby allowing electrical cable conductors 181 received within slots 308 to lay substantially flat against sealant administration portion 304.

Although four slots are shown in FIGS. 3A and 3B, it should be understood that any suitable number of slots for receiving a corresponding number of electrical cable conductors may be provided in cartridge 116. In this manner, sealing cartridge 116 may provide a modular mechanism for handling electrical cables having different numbers of conductors in a common fitting design.

FIGS. 4A and 4B are rear and front isometric views of an exemplary sealing sleeve 114. As shown, in FIG. 1A, 4A, and 4B, sealing sleeve 114 may include rearward end 400 and a forward end 402 having a generally tubular configuration. Rearward end 400 may include a shoulder portion 404 having larger inside and outside diameters relative to the remainder of sealing sleeve 114, as described above. In one embodiment, an inside diameter of shoulder portion 404 may be sized to receive annular shoulder 306 in cartridge 116. As described briefly above, annular groove 142 in internal tubular portion 140 of fitting body 102 may receive rearward end 400 of sealing sleeve 114. In some implementations, an axial length of shoulder portion 404 may be sized substantially similarly to an axial distance from conductor egressing end 126 of fitting body 102 and a rearwardmost portion of annular groove 142.

Consistent with embodiments described herein, an inside diameter of forward end 402 of sealing sleeve 114 may be substantially similar to an outside diameter of conductor separating portion 302 of sealing cartridge 116, such that sealing sleeve 114 may axially receive sealing cartridge 116 upon placement of electrical cable conductors 181 within slots 308.

During assembly, and following insertion of electrical cable 180 through tubular sleeve 104 and fitting body 102, electrical cable conductors 181 (extending from central bore 134 in fitting body 102) may be positioned within slots 308 in sealing cartridge 116. Cartridge 116 may be seated within sealing sleeve 114, and sealing sleeve 114 may then be axially received within annular groove 142 in internal tubular portion 140 of fitting body 102. In some implementations, fitting 100 may be positioned vertically during assembly, such that sealing sleeve 114 and conductors 181 project upwardly from fitting body 102. Sealing compound (not shown) may be inserted or injected into central bore 300 via sealant administration portion 304 and allowed to flow into sealant receiving chamber 314, abut sealing barrier 152, and flow around and between electrical cable conductors 181 received within slots 308 while filling sealing sleeve 114. The vertical orientation of fitting 100 provides a gravity assisted flow of sealing compound during assembly.

Consistent with embodiments described herein, each of sealing sleeve 114 and sealing cartridge 116 may be formed of a transparent material, such as a transparent plastic, to allow visible confirmation that complete distribution of the sealing compound between and around conductors 181 has been accomplished. Following visual confirmation of such distribution, the fitting body 102 may be secured between hub nut 118 and the main nut 108.

Returning to FIG. 1A, hub nut 118 may include an elongated hollow generally tubular member that includes rearward end 188, an intermediate portion 195, and a forward end 196. As shown, rearward cable receiving end 188, intermediate portion 195, and forward end 196 may be formed in a substantially annularly notched configuration, such that rearward end 188 has a larger inside diameter than intermediate portion 195, and intermediate portion 195 has larger inside diameter than forward end 196.

As described above, rearward end 188 includes external threads 186 for engaging internal threads 179 in main nut 108. Additionally, as shown in FIGS. 1A and 1B, inside diameter of rearward end 188 may include annular rib 197 positioned to correspond with annular rib 135 in fitting body 102 to engage O-ring 120 during assembly of fitting 100.

Intermediate portion 195 of hub nut 118 may include an inside diameter sized to accommodate forward end 126 of fitting body 102. Further, intermediate portion 195 may include an outer tool engagement surface, such as a hexagonal configuration for engaging a tool during tightening of hub nut 118 relative to main nut 108 or on a housing or other structure (not shown) for receiving fitting 100.

Forward end 196 of hub nut 118 may include an inside diameter sized to accommodate sealing sleeve 114, as shown in FIG. 1B. For example, following distribution of a sealing compound within sealing sleeve 114, hub nut 118 may be slid along conductors 181 and onto fitting body 102. External threads 186 in hub nut 118 may then engage internal threads 179 in main nut 108 to secure fitting body 102 and main nut 108 to hub nut 118.

Tightening of main nut 108 relative to hub nut 118 (e.g., by engaging both tool engaging surface on intermediate portion 195 and tool engagement surface 177 of main nut 108) may cause compression/engagement of clamping ring 106 onto cable braiding 182 of cable 180, thereby securing cable 180 within fitting 100. Such engagement may further cause O-ring 120 to be compressed between flange 133 and annular ribs 135/197 thereby effecting a liquid-proof seal between hub nut 118 and fitting body 102.

As shown in FIGS. 1A and 1B, forward end 196 of hub nut 118 may further include external threads 198 formed on an outer surface thereof for engaging corresponding threads in a housing (e.g., junction box, transformer, etc.) or other structure for receiving fitting 100.

Consistent with embodiments described herein, fitting 100 may be initially provided (e.g., from a manufacturing facility) as a number of pre-assembled sub-assemblies. For example, as shown in FIG. 1B, in one embodiment, a first sub-assembly may include main nut 108, clamping ring 106, compression bushing 110, and gland nut 112, and a second sub-assembly may include fitting body 102, tubular sleeve 104, O-ring 120, sealing sleeve 114, sealing cartridge 116, and hub nut 118.

During final assembly, an installer may initially thread a prepared end of cable 180 (e.g., in which a portion of the outer insulator of cable 180 has been removed and conductors 181 extend from an exposed portion of conductive braiding 182 and center insulation 184) through the first sub-assembly and into tubular sleeve 104 of the second sub-assembly. As described above, continued insertion of the cable 180 may cause the angled portion of cable receiving end 144 to separate the braiding 182 from center insulation 184. Once the braiding 182 is fully seated against flange 146 of tubular sleeve 104, the first sub-assembly may be threaded to the second sub-assembly, such as by engaging threads 129 in fitting body 102 with threads 179 in main nut 108.

At this point, hub nut 118 may be removed from the second sub-assembly to allow visual confirmation that braiding 182 has fully seated within fitting body 102 via apertures 138 in fitting body. Sealant may then be injected into sealing sleeve and permitted to cure and the entire fitting 100 may be fully assembled, by reinstalling hub nut 118 onto fitting body and securing hub nut 118 to main nut 108 via threads 186 in hub nut 118 and threads 179 in main nut 108.

By providing fitting 100 as two pre-assembled sub-assemblies, field installation may be simplified.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

For example, various features have been mainly described above with respect to armored or metal clad electrical cables and connectors for such cables. In other embodiments, features described herein may be implemented in relation to other types of cables.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A fitting for terminating an electrical cable having a central insulation portion and a braiding portion formed over the central insulation portion, comprising:
   a substantially tubular fitting body having a central bore extending therethrough, a forward end, and a cable receiving end,
   wherein the central bore is configured to receive the electrical cable therethrough;

a substantially tubular sleeve positioned within the central bore in the cable receiving end of the fitting body,
wherein the tubular sleeve comprises an angled rearward portion,
wherein a diameter of the angled rearward portion of the tubular sleeve is substantially equivalent to an outside diameter of the central insulation portion of the electrical cable, such that when inserting the electrical cable into the fitting body, the angled rearward portion of the tubular sleeve is inserted between the central insulation portion and the braiding portion of the electrical cable;
a substantially tubular clamping ring positioned within the central bore in the cable receiving end of the fitting body,
wherein the clamping ring is configured to engage the fitting body and the tubular sleeve during assembly of the fitting to secure the braiding portion between the tubular sleeve and the clamping ring; and
a main nut rotatably coupled to the cable receiving end of the fitting body,
wherein the main nut is configured to urge the clamping ring toward the forward end of the fitting body and into engagement with the fitting body and the tubular sleeve.

2. The fitting of claim 1, wherein the fitting body further comprises:
an angled interior surface for urging the clamping ring toward the tubular sleeve during assembly of the fitting.

3. The fitting of claim 1, wherein the clamping ring further comprises:
an angled configuration wherein an outside diameter of a forward portion of the clamping ring is smaller than an outside diameter of an intermediate portion of the clamping ring.

4. The fitting of claim 3, wherein the angled configuration of the clamping ring further comprises an inside diameter of the forward portion of the clamping ring that is larger than the inside diameter of the intermediate portion of the clamping ring.

5. The fitting of claim 1, wherein the angled rearward portion of the tubular sleeve comprises an angle of approximately 30-60° relative to an axial direction of the fitting.

6. The fitting of claim 1, wherein the tubular sleeve further comprises a flanged forward portion for engaging a corresponding portion in the forward end of the fitting body.

7. The fitting of claim 1, wherein the tubular sleeve further comprises a conical outer portion configured to urge the braiding portion of the installed electrical cable toward the clamping ring during assembly of the fitting.

8. The fitting of claim 1, wherein the clamping ring comprises a resilient material.

9. The fitting of claim 1, wherein an interior portion of the main nut comprises a annular notch for receiving a rearward end of the clamping ring.

10. The fitting of claim 9, wherein the rearward end of the clamping ring is press fit into the annular notch in the main nut, to secure the clamping ring to the main nut prior to assembly of the fitting.

11. The fitting of claim 1, wherein the tubular sleeve further comprises:
a sealing barrier located within a central bore of the tubular sleeve,
wherein the sealing barrier includes an axial aperture for receiving conductors of the electrical cable.

12. The fitting of claim 11, wherein the sealing barrier comprises a resilient elastomer.

13. The fitting of claim 1, wherein the fitting body comprises one or more radial apertures formed therein for enabling visual confirmation of a clamping of the clamping ring to the braiding portion of the installed electrical cable.

14. The fitting of claim 13, wherein the one or more radial apertures comprise three or more spaced apertures for enabling 360° visual confirmation of the clamping of the clamping ring to the braiding portion of the installed electrical cable.

15. The fitting of claim 1, further comprising:
a substantially tubular hub nut positioned forward of the fitting body,
wherein the hub nut includes a bore therein for receiving the one or more conductors of the electrical cable, and
wherein the hub nut is rotatably secured to the fitting body during assembly of the fitting.

16. The fitting of claim 15, further comprising:
a gland nut rotatably coupled to a cable receiving end of the main nut; and
a substantially tubular compression bushing positioned between the gland nut and the main nut,
wherein axial movement of the gland nut relative to the main nut cause compression of the compression bushing to retaining the electrical cable in the fitting.

17. The fitting of claim 16,
wherein the main nut, clamping ring, the compression bushing, and the gland nut comprise a first pre-assembled sub-assembly,
wherein the fitting body, the tubular sleeve, and the hub nut comprise a second pre-assembled sub-assembly, and
wherein final assembly of the fitting comprises inserting a prepared end of a cable through the first sub-assembly and the second sub-assembly, and securing the second sub-assembly to the first sub-assembly.

18. A fitting for terminating an electrical cable having two or more conductors, a central insulation portion, and a braided outer portion, comprising:
a substantially tubular fitting body having a central bore extending therethrough, a forward end, and a cable receiving end;
a tubular sleeve that includes an angled rearward portion positioned within the central bore of the fitting body, wherein the angled rearward portion of the tubular sleeve is configured for insertion between the center insulation portion and the braided outer portion of an installed electrical cable;
a clamping ring positioned within the central bore of the fitting body about the tubular sleeve,
wherein, upon assembly of the fitting, the clamping ring is configured to clampingly engage the central bore of the fitting body and the tubular sleeve to secure the braided outer portion of the installed electrical cable to the fitting.

19. The fitting of claim 18, further comprising:
a main nut rotatably coupled to the cable receiving end of the fitting body,
wherein the main nut is configured to urge the clamping ring into a clamping arrangement with the fitting body and the tubular sleeve; and
a tubular hub nut positioned forward of the fitting body,
wherein the hub nut includes a bore therein for receiving one or more conductors of the electrical cable, and
wherein the hub nut is rotatably secured to the main nut during assembly of the fitting to secure the fitting body within the fitting.

20. The fitting of claim 18, wherein the clamping ring comprises a resilient material and includes a tapered configuration for increasing pressure on the braided outer portion of the electrical cable during assembly of the fitting.

21. The fitting of claim 18, wherein the fitting body comprises one or more radial apertures formed therein for enabling visual inspection of a clamping arrangement between the braided outer portion of the electrical cable, the clamping ring, and the tubular sleeve.

22. A method for assembling a fitting for an electrical cable having one or more conductors, a central insulation portion, and an outer braided portion, comprising:
- inserting the electrical cable through a first sub-assembly comprising a substantially tubular main nut and a clamping ring positioned within the main nut;
- inserting the electrical cable through a second sub-assembly comprising a fitting body, a substantially tubular sleeve, and a substantially tubular hub nut;
- wherein the fitting body includes a central bore extending therethrough,
- wherein the substantially tubular sleeve is positioned within the central bore in a rearward receiving end of the fitting body,
- wherein the tubular sleeve comprises an angled rearward portion,
- wherein the electrical cable is inserted into the second sub-assembly such that the angled rearward portion is inserted between the braided outer portion and the central insulation portion of the electrical cable;
- coupling the main nut to the rearward end of a fitting body to position the clamping ring within the central bore in the cable receiving end of the fitting body;
- coupling a rearward end of the substantially tubular hub nut to the forward end of the main nut to secure the fitting body between the main nut and the hub nut; and
- tightening the main nut to the hub nut to cause the clamping ring to engage the fitting body and the tubular sleeve to secure the braiding between the tubular sleeve and the clamping ring.

23. The method of claim 22, wherein the fitting body comprises one or more radial apertures formed therein, the method further comprising:
- removing the hub nut from the main nut to facilitate visual inspection of a clamping engagement between the clamping ring, the braided outer portion of the electrical cable, and the tubular sleeve via the one or more radial apertures.

24. The method of claim 22, wherein the fitting body comprises an internal angled surface, the tubular sleeve further comprises a conical outer surface, and the clamping ring comprises a tapered configuration to increase a clamping pressure between the clamping ring and the tubular sleeve during tightening of the main nut to the hub nut.

\* \* \* \* \*